United States Patent [19]

Feuer

[11] Patent Number: 5,155,195
[45] Date of Patent: Oct. 13, 1992

[54] SIDECHAIN COPOLYMERS EXHIBITING NONLINEAR OPTICAL RESPONSE

[75] Inventor: Bernice I. Feuer, Berkeley Heights, N.J.

[73] Assignee: Hoechst Celanese Corp., Somerville, N.J.

[21] Appl. No.: 701,557

[22] Filed: May 16, 1991

[51] Int. Cl.$^5$ .......................................... C08F 230/08
[52] U.S. Cl. ................................. 526/243; 526/245; 526/259; 526/279; 526/298; 526/286; 526/288; 526/311; 526/312
[58] Field of Search ............... 526/279, 311, 298, 243, 526/245, 248, 288, 286, 259

[56] References Cited

U.S. PATENT DOCUMENTS

| | | | |
|---|---|---|---|
| 4,625,006 | 11/1986 | Bernhardt | 526/279 |
| 4,742,136 | 5/1988 | Uchida | 526/279 |
| 4,822,865 | 4/1989 | DeMartino et al. | 526/292.2 |
| 4,865,430 | 9/1989 | DeMartino et al. | 350/376 |
| 4,898,895 | 2/1990 | Masuoka | 523/122 |
| 4,915,491 | 4/1990 | DeMartino et al. | 350/330 |
| 5,041,509 | 8/1991 | Lee et al. | 526/243 |
| 5,041,510 | 8/1991 | Allen et al. | 526/243 |

*Primary Examiner*—Joseph L. Schofer
*Assistant Examiner*—M. Nagumo
*Attorney, Agent, or Firm*—P. S. Kalyanaraman

[57] ABSTRACT

In one embodiment this invention provides a novel type of copolymer which can be formed into a thin film nonlinear optical medium which exhibits superior light transmission properties, and which has excellent adhesion properties when laminated with inorganic or organic layers.

An invention copolymer is illustrated by the structure:

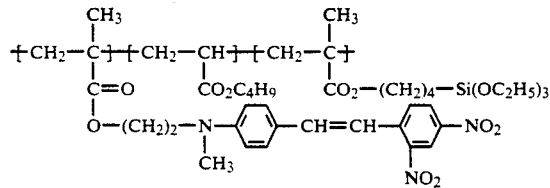

4 Claims, No Drawings

SIDECHAIN COPOLYMERS EXHIBITING NONLINEAR OPTICAL RESPONSE

BACKGROUND OF THE INVENTION

Polymers with a comb structure of pendant side chains are a new class of organic materials which exhibit interesting optical properties.

In U.S. Pat. Nos. 4,694,066; 4,755,574; and 4,762,912 polymers are described which have pendant side chains which exhibit nonlinear optical susceptibility, in addition to mesogenic properties.

U.S. Pat. No. 4,792,208 discloses nonlinear optically responsive organic compounds and side chain polymers in which the molecular dipoles have an electron donor moiety linked through a conjugated $\pi$ bonding system to an electron acceptor sulfonyl moiety.

U.S. Pat. No. 4,808,332 and U.S. Pat. No. 4,810,338 disclose polymers with pendant side chains in which a stilbene-type structure or a diphenylbutadiene-type structure is in conjugation with an electron-donating group and an electron-withdrawing group. These extended conjugated dipolar electronic systems exhibit an exceptionally high level of second order nonlinear optical susceptibility $\beta$.

Thin films of organic or polymeric materials with large second order nonlinearities in combination with silicon-based electronic circuitry have potential as systems for laser modulation and deflection, information control in optical circuitry, and the like.

Waveguide devices are being developed with are composed of a laminated matrix of nonlinear optically responsive polymeric waveguiding and cladding thin films on a supporting substrate. The polymeric thin films are difficult to form and maintain crack-free, and there is a tendency for a matrix of polymeric layers to delaminate because of weak adhesion between the layers.

There is continuing interest in the development of new and improved polymeric optical waveguiding systems.

Accordingly, it is an object of this invention to provide novel optically responsive polymers.

It is another object of this invention to provide acrylic copolymers having side chains which exhibit nonlinear optical response.

It is another object of this invention to provide nonlinear optically responsive thin films which form laminates with a high degree of bond strength between interlayers.

It is a further object of this invention to provide optical light switch and light modulator devices with a transparent polymeric nonlinear optical component comprising a thin film of an acrylic copolymer with nonlinear optically-responsive pendant side chains which can be uniaxially oriented to an external field.

Other objects and advantages of the present invention shall become apparent from the accompanying description and examples.

DESCRIPTION OF THE INVENTION

One or more objects of the present invention are accomplished by the provision of a copolymer which is characterized by recurring monomeric units corresponding to the formula:

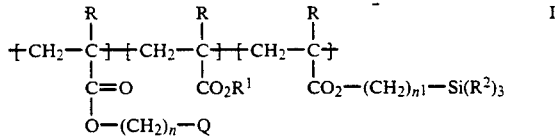

where R is hydrogen or a $C_1$-$C_4$ alkyl substituent; $R^1$ is a $C_1$-$C_8$ alkyl substituent; $R^2$ individually is an aliphatic, alicyclic or aromatic substituent containing between about 1-20 carbon atoms; Q is a chromophore which exhibits nonlinear optical susceptibility; n is an integer with a value of 2-12; $n^1$ is an integer with a value of 0-8; and the copolymer has a glass transition temperature in the range between about 40°-220° C.

In another embodiment this invention provides a copolymer which is characterized by recurring monomeric units corresponding to the formula:

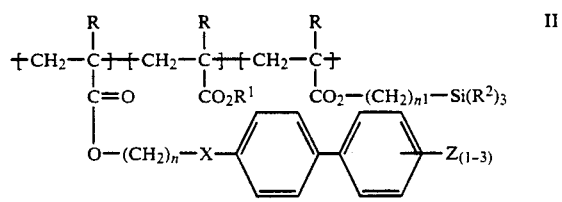

where R is hydrogen or a $C_1$-$C_4$ alkyl substituent; $R^1$ is a $C_1$-$C_8$ alkyl substituent; $R^2$ individually is an aliphatic, alicyclic or aromatic substituent containing between about 1-20 carbon atoms; n is an integer with a value of 2-12; $n^1$ is an integer with a value of 0-8; X is an electron-donating group; Z is an electron-withdrawing group; and the copolymer has a glass transition temperature between about 40°-220° C.

In another embodiment this invention provides a copolymer which is characterized by recurring monomeric units corresponding to the formula:

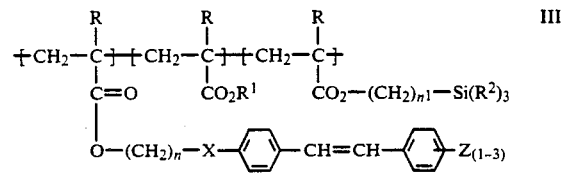

where R, $R^1$, $R^2$, n, $n^1$, X and Z are as previously defined; and the copolymer has a glass transition temperature between about 40°-220° C.

In another embodiment this invention provides a copolymer which is characterized by recurring monomeric units corresponding to the formula:

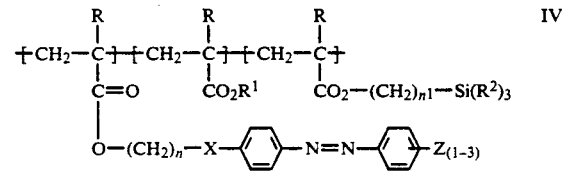

where R, $R^1$, $R^2$, n, $n^1$, X and Z are as previously defined; and the copolymer has a glass transition temperature between about 40°-220° C.

In another embodiment this invention provides a copolymer which is characterized by recurring monomeric units corresponding to the formula:

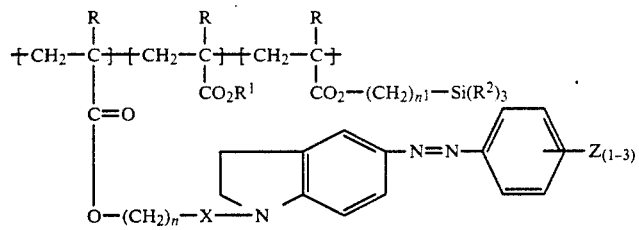

where R, $R^1$, $R^2$, n, $n^1$ and Z are as previously defined; and the copolymer has a glass transition temperature between about 40°-220° C.

Illustrative of $C_1$-$C_4$ and $C_1$-$C_8$ alkyl substituents are methyl, ethyl, propyl, isopropyl, butyl, isobutyl, 2-butyl, pentyl, hexyl, 2-hexyl, heptyl, octyl and isooctyl radicals.

Illustrative of $R^2$ substituents are methyl, ethyl, propyl, butyl, hexyl, octyl, methoxy, ethoxy, propoxy, butoxy, ethoxyethoxy, phenyl, 4-methoxyphenyl, and the like, and the $R^2$ substituent can be the same or different structures.

The $R^2$ substituent also can be selected from olefinically unsaturated radicals such as methacroyloxyalkyl. In Formulas I-IV, one or more of the $R^2$ substituents can be olefinically unsaturated. The presence of olefinic unsaturation in a $R^2$ substituent permits some degree of crosslinking between the polymer chains during polymerization. The degree of crosslinking can be controlled by limiting the quantity of polymerizable olefinic groups in the $R^2$ substituents and/or the molar quantity of the silane comonomer. A convenient means of crosslinking control in a terpolymer is by utilizing two silane comonomers, only one of which contains olefinic unsaturation in one or more $R^2$ groups.

Suitable X electron-donating substituents include —NR—, —O— and —S—, where R is hydrogen or a $C_1$-$C_4$ alkyl group.

Suitable Z electron-withdrawing substituents include —$NO_2$, —CN, —$CF_3$, —CH=C(CN)$_2$, —CCN=C(CN)$_2$ and —$SO_2CF_3$. Multiple Z substituents can be the same or different structures. A preferred type of copolymer is one in which the Z substituent is present as one, two or three nitro groups on the phenyl ring.

A typical copolymer of the present invention has a weight average molecular weight in the range between about 5000-500,000, and a glass transition temperature in the range between about 60°-200° C.

Synthesis Of Monomers And Copolymers

A. Stilbene Alcohol Intermediate

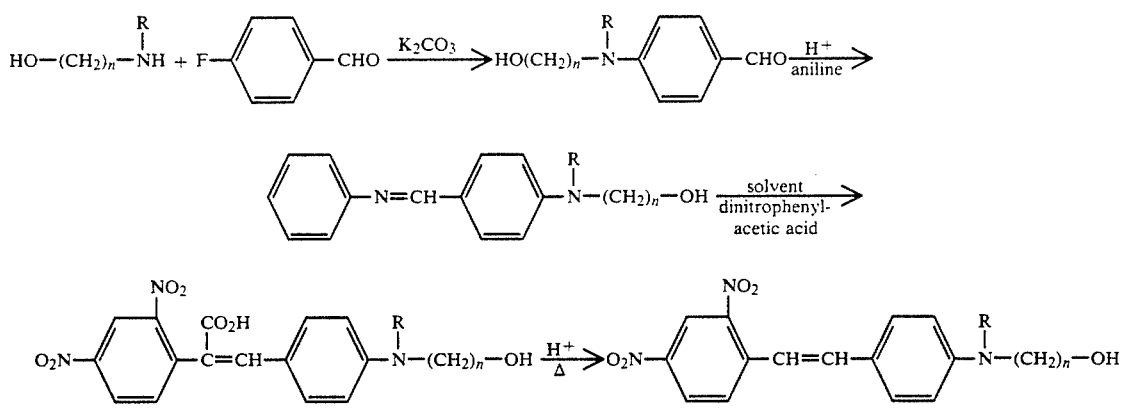

B. Monomer and Copolymer

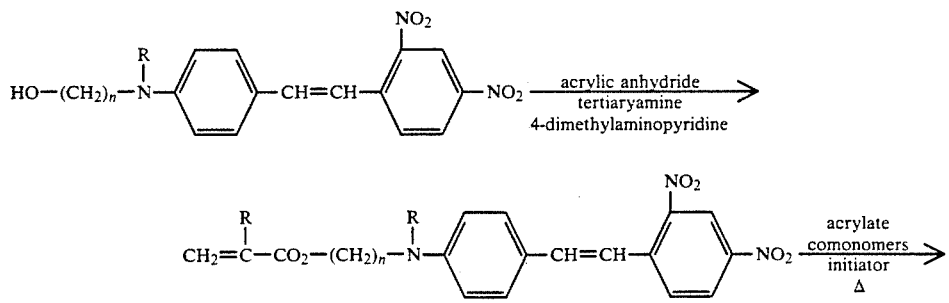

-continued

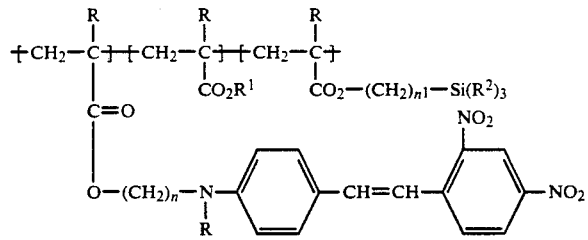

Similar procedures are followed to synthesize terpolymers with an electron-donating group other than —NR—, and/or an electron-withdrawing group other than —$NO_2$.

In a typical terpolymer the silane comonomer is present in quantity between about 0.5–50 mole percent, and the other comonomers respectively are present in a quantity between about 10–90 mole percent, based on the total moles of comonomers. One or more additional polymerizable comonomers, such as styrene or alkyl vinyl ether, can be included in the copolymer to introduce a desirable alteration of properties in the material.

In another embodiment this invention provides a nonlinear optical medium consisting of a transparent film of a copolymer which is characterized by recurring monomeric units corresponding to the formula:

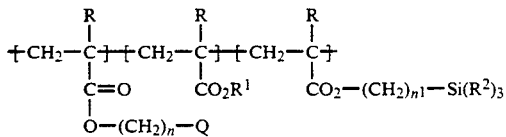

where R is hydrogen or a $C_1$-$C_4$ alkyl substituent; R is a $C_1$-$C_8$ alkyl substituent; $R^2$ individually is an aliphatic, alicyclic or aromatic substituent containing between about 1–20 carbon atoms; Q is a chromophore which exhibits nonlinear optical susceptibility; n is an integer with a value of 2–12; $n^1$ is an integer with a value of 0–8; and the copolymer has a glass transition temperature in the range between about 40°–220° C.

In another embodiment this invention provides a nonlinear optical medium consisting of a transparent film of a copolymer which is characterized by recurring monomeric units corresponding to the formula:

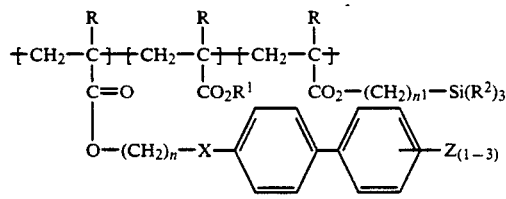

where R, $R^1$, $R^2$, n, $n^1$, X and Z are as previously defined; and the copolymer has a glass transition temperature between about 40°–220° C.

In another embodiment this invention provides a nonlinear optical medium consisting of a transparent film of a copolymer which is characterized by recurring monomeric units corresponding to the formula:

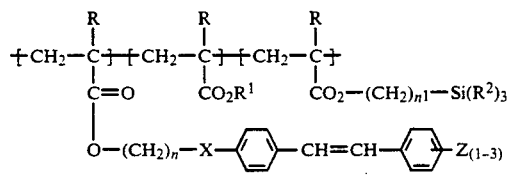

where R, $R^1$, $R^2$, n, $n^1$, X and Z are as previously defined; and the copolymer has a glass transition temperature between about 40°–220° C.

In another embodiment this invention provides a nonlinear optical medium consisting of a transparent film of a copolymer which is characterized by recurring monomeric units corresponding to the formula:

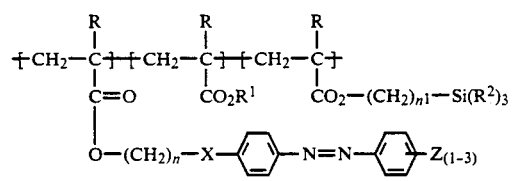

where R, $R^1$, $R^2$, n, $n^1$, X and Z are as previously defined; and the copolymer has a glass transition temperature between about 40°–220° C.

In another embodiment this invention provides a nonlinear optical medium consisting of a transparent film of a copolymer which is characterized by recurring monomeric units corresponding to the formula:

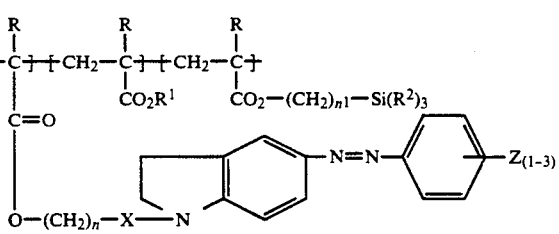

where R, $R^1$, $R^2$, n, $n^1$, and Z are as previously defined; and the copolymer has a glass transition temperature between about 40°–220° C.

A nonlinear optical medium can be formed by applying a thin film of invention copolymer to a supporting substrate by conventional means, such as spin-coating, spraying, Langmuir-Blodgett deposition, and the like.

A present invention thin film nonlinear optical medium has superior properties as compared to a thin film of a copolymer which does not contain a silane comonomer. A present invention thin film can be formed in a crack-free state, and it exhibits excellent binding to organic or inorganic substrates or inter-laminated layers.

A present invention copolymer has pendant side chains which exhibit nonlinear optical susceptibility $\beta$, and a film or coating fabricated with a present invention copolymer exhibits third order nonlinear optical susceptibility.

A thin film nonlinear optical medium of the present invention can be subjected to an external field to uniaxially orient the copolymer side chains. In one method the copolymer medium is heated close to or above the copolymer glass transition temperature $T_g$, then an external field (e.g., a DC electric field) is applied to the medium of mobile copolymer molecules to induce uniaxial molecular alignment of copolymer side chains parallel to the applied field, and the medium is cooled while maintaining the eternal field effect.

By this method a present invention nonlinear optical medium has a stable uniaxial alignment of copolymer side chains. The poled optical medium exhibits a second nonlinear optical susceptibility $\chi^{(2)}$. A present invention poled optical medium is capable of exhibiting a $\chi^{(2)}$ level of $2 \times 10^{-8}$ esu or higher as measured at 1.34 μm excitation wavelength.

In another embodiment this invention provides an optical light switch or light modulator device which contains a polymeric nonlinear optical component comprising a transparent solid medium of a copolymer which is characterized by recurring monomeric units corresponding to the formula:

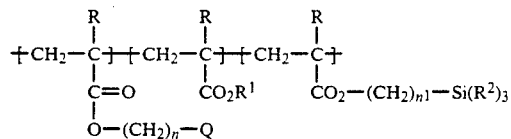

where R is hydrogen or a $C_1-C_4$ alkyl substituent; $R^1$ is a $C_1-C_8$ alkyl substituent; $R^2$ individually is an aliphatic, alicyclic or aromatic substituent containing between about 1-20 carbon atoms; Q is a chromophore which exhibits nonlinear optical susceptibility; n is an integer with a value of 2-12; $n^1$ is an integer with a value of 0-8; and the copolymer has a glass transition temperature in the range between about 40°-220° C.

In a present invention optical light switch or light modulator device, the polymeric nonlinear optical component exhibits less than about 10 percent scattering of transmitted incident light waves.

The term "transparent" as employed herein refers to a polymeric optical medium which is transparent or light transmitting with respect to incident fundamental and created light frequencies. In a present invention optical device, the copolymeric thin film nonlinear optical medium component is transparent to both the incident and exit light frequencies.

The term "external field" as employed herein refers to an electric, magnetic or mechanical stress field which is applied to a substrate of mobile copolymer molecules, to induce dipolar alignment of the copolymer molecules parallel to the field.

A present invention optical device can be a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, an optical parametric device, and the like, as elaborated in U.S. Pat. No. 4,775,215.

The theory of nonlinear harmonic generation by frequency modulation of coherent light is elaborated by A. F. Garito et al in Chapter 1, "Molecular Optics: Nonlinear Optical Properties Of Organic And Polymeric Crystals"; ACS Symposium Series 233 (1983).

An optical interferometric waveguide gate device is described by A. Lattes et al in IEEE J. Quantum Electronics, QE-19(11). 1718 (1983).

A wide-band electrooptical guided wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. No. 4,515,429 and 4,583,818; and by P. W. Smith et al in Applied Physics Letters, 30(6); 280 (1977) and in IEEE Spectrum, Jun. 1981.

Optical parametric devices are described in U.S. Pat. Nos. 3,371,220; 3,530,301; and 3,537,020.

A present invention optical device can be achieved by constructing one of the optical devices described in the technical literature, except that a present invention polymer medium is utilized as the nonlinear optical component.

The following examples are further illustrative of the present invention. The components and specific ingredients are presented as being typical, and various modifications can be derived in view of the foregoing disclosure within the scope of the invention.

EXAMPLE I

This Example illustrates the preparation of a terpolymer in accordance with the present invention.

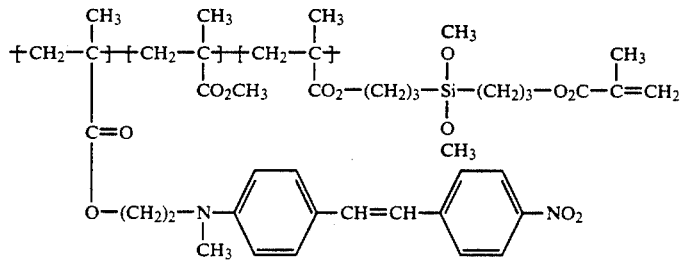

A 36.6 gram (0.1 mole) quantity of 4-(N-2-methacroyloxyethyl-N-methylamino)-4'-nitrostilbene is added to 366 ml of dimethylsulfoxide in a one liter reactor fitted with an air-tight mechanical stirrer and rubber septa. To the suspension mixture in the reactor is added 8.0 grams (0.08 mole) of methyl methacrylate and 4.97 grams (0.01 mole; 5.6 ml) of Prosil 2213 [dimethoxydi(3-methacroyloxypropyl)silane; PCR, Gainsville, Fla.].

Argon is bubbled through the reaction medium for one hour, and 0.33 gram (0.002 mole) of 2,2′-azobisisobutyronitrile initiator is added. Argon is bubbled through the reaction medium for an additional 15 minutes, then the reactor is heated to 68° C. and the polymerization reaction is conducted over a 48 hour period.

The terpolymer is precipitated by pouring the product solution into 3.5 liters of ethyl acetate. The polymer product is collected by filtration, and dried in a vacuum oven at 50° C. The polymer product is redissolved in 1,2-dichloroethane, precipitated in 3.5 liters of ethyl acetate containing 10% by volume of tetrahydrofuran, collected by filtration, and dried. The glass transition temperature of the terpolymer is 137° C.

A similar terpolymer is prepared by using the corresponding azobenzene or indolinylazobenzene monomeric structure in place of 4-(N-2-methacroyloxyethyl-N-methylamino)-4′-nitrostilbene.

EXAMPLE II

This Example illustrates the preparation of a terpolymer in accordance with the present invention.

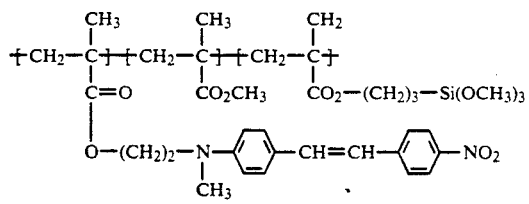

A 36.6 gram (0.1 mole) quantity of 4-[N-2-methacroyloxyethyl-N-methyl amino]-4′-nitrostilbene is added to 366 ml of dimethylsulfoxide in a one liter reactor fitted with an air tight mechanical stirrer and rubber septa. To the suspension mixture in the reactor is added 9.0 grams (0.09 mole) of methyl methacrylate and 2.57 grams (0.01 mole, 2.5 ml) of gamma-methoxyacroyloxy-propyl-trimethoxysilane.

Argon is bubbled through the reaction medium for one hour, and 0.33 grams (0.002 mole) of 2,2′-azobisisobutyronitrile initiator is added. Argon is bubbled through the solution for an additional 15 minutes, then the reactor is heated to 68° C. and the polymerization is conducted over a 48 hour period.

The terpolymer is precipitated by pouring the product solution into 3.5 liters of ethyl acetate. The polymer product is collected by filtration and dried in a vacuum oven at 50° C. The polymer product is redissolved in 1,2-dichloroethane and precipitated into 3.5 liters of ethyl acetate containing 10% by volume tetrahydrofuran, collected by filtration, and dried. The glass transition temperature of the terpolymer is 137.9° C.

Anal. Calc.: C,66.04; H,6.55; N,5.83; O,20.99; Si,0.58.
Found: C,66.57; H,6.53; N,5.85; O,19.71; Si,0.66.

A similar terpolymer is prepared by using 4-(4-acroyloxybutyloxy)-2′,4′-dicyanostilbene monomer in place of 4-(N-2-methacroyloxyethyl-N-methylamino)-4′-nitrostilbene.

What is claimed is:

1. A copolymer which is characterized by recurring monomeric units corresponding to the formula:

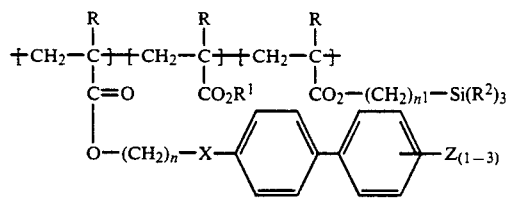

where R is hydrogen or a $C_1$-$C_4$ alkyl substituent; $R^1$ is a $C_1$-$C_8$ alkyl substituent; $R^2$ moieties are selected from the group consisting of a $C_1$-$C_4$ alkyl substituent, a $C_1$-$C_4$ alkoxy group, and an olefinically unsaturated group, and from combinations thereof; n is an integer with a value of 2-12; $n^1$ is an integer with a value of 0-8; X is an electron-donating group that is —NR—, —O—, or —S—; Z is an electron-withdrawing group that is —$NO_2$, —CN, —$CF_3$, —CH=C(CN)$_2$, —C(CN)=C(CN)$_2$ or —$SO_2CF_3$; and the copolymer has a glass transition temperature between about 40°-220° C.

2. A copolymer which is characterized by recurring monomeric units corresponding to the formula:

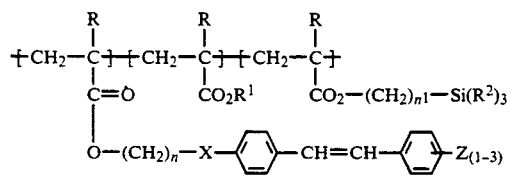

where R is hydrogen or a $C_1$-$C_4$ alkyl substituent; $R^1$ is a $C_1$-$C_8$ alkyl substituent; $R^2$ moieties are selected from the group consisting of a $C_1$-$C_4$ alkyl substituent, a $C_1$-$C_4$ alkoxy group, and an olefinically unsaturated group, and from combinations thereof; n is an integer with a value of 2-12; $n^1$ is an integer with a value of 0-8; X is an electron-donating group that is —NR—, —O—, or —S—; Z is an electron-withdrawing group that is —$NO_2$, —CN, —$CF_3$, —CH=C(CH)$_2$, —C(CN)=C(CN)$_2$ or —$SO_2CF_3$; and the copolymer has a glass transition temperature between about 40°-220° C.

3. A copolymer which is characterized by recurring monomeric units corresponding to the formula:

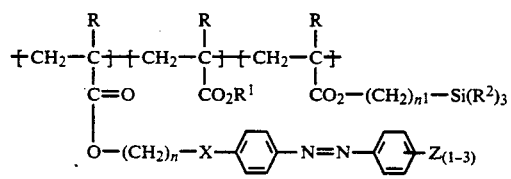

where R is hydrogen or a $C_1$-$C_4$ alkyl substituent; $R^1$ is a $C_1$-$C_8$ alkyl substituent; $R^2$ moieties are selected from the group consisting of a $C_1$-$C_4$ alkyl substituent, a $C_1$-$C_4$ alkoxy group, and an olefinically unsaturated group, and from combinations thereof; n is an integer with a value of 2-12; $n^1$ is an integer with a value of 0-8; X is an electron-donating group that is —NR—, —O—, or —S—; Z is an electron-withdrawing group that is —$NO_2$, —CN, —$CF_3$, —CH=C(CN)$_2$, —C(CN)=C(CN)$_2$ or —$SO_2CF_3$; and the copolymer has a glass transition temperature between about 40°-220° C.

4. A copolymer which is characterized by recurring monomeric units corresponding to the formula:

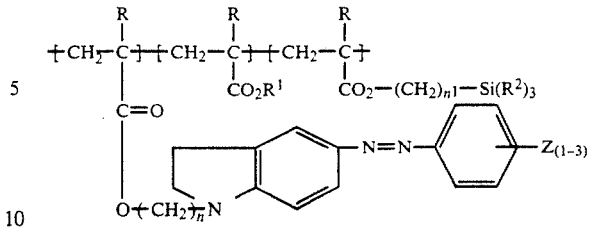

where R is hydrogen or a $C_1$-$C_4$ alkyl substituent; $R^1$ is a $C_1$-$C_8$ alkyl substituent; $R^2$ moieties are selected from the group consisting of a $C_1$-$C_4$ alkyl substituent, a $C_1$-$C_4$ alkoxy group, and an olefinically unsaturated group, and from combinations thereof; n is an integer with a value of 2-12; $n^1$ is an integer with a value of 0-8; X is an electron-donating group that is —NR—, —O—, or —X—; Z is an electron-withdrawing group that is —$NO_2$, —CN, —$CF_3$, —CH=C(CN)$_2$, —C(CN)=C(CN)$_2$ or —$SO_2CF_3$; and the copolymer has a glass transition temperature between about 40°-220° C.

* * * * *